T. C. HINES.
BOLL WEEVIL CATCHER.
APPLICATION FILED AUG. 10, 1917.

1,253,176.

Patented Jan. 8, 1918.
2 SHEETS—SHEET 1.

WITNESSES

INVENTOR
T. C. Hines
BY Victor J. Evans
ATTORNEY

T. C. HINES.
BOLL WEEVIL CATCHER.
APPLICATION FILED AUG. 10, 1917.
1,253,176.
Patented Jan. 8, 1918.
2 SHEETS—SHEET 2.
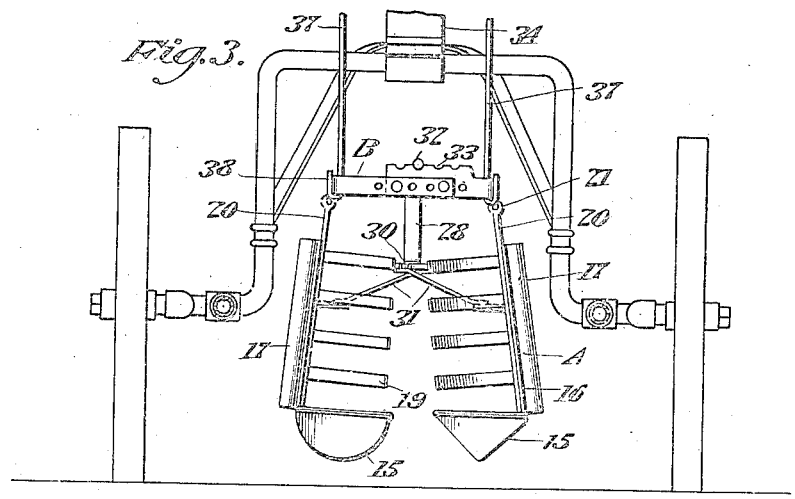
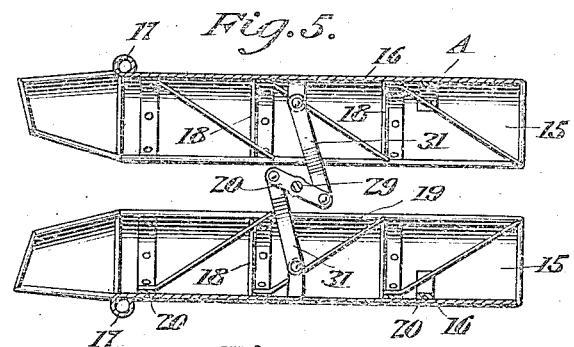
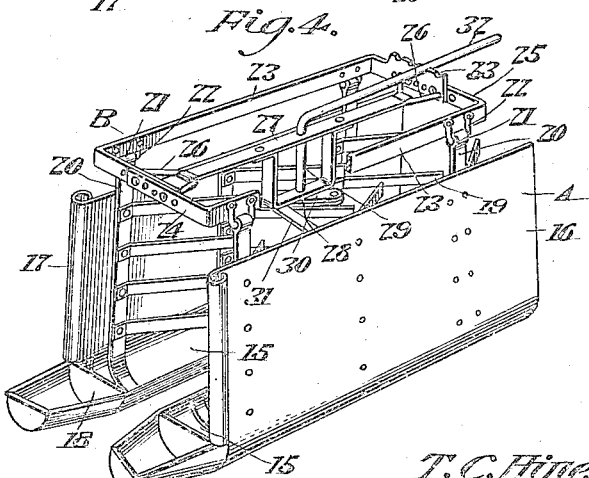
WITNESSES
INVENTOR
T. C. Hines
BY Victor J. Evans
ATTORNEY

UNITED STATES PATENT OFFICE.

THOMAS CLAUDE HINES, OF RIPLEY, MISSISSIPPI.

BOLL-WEEVIL CATCHER.

1,253,176.

Specification of Letters Patent.   Patented Jan. 8, 1918.

Application filed August 10, 1917.   Serial No. 185,567.

*To all whom it may concern:*

Be it known that I, THOMAS C. HINES, a citizen of the United States, residing at Ripley, in the county of Tippah and State of Mississippi, have invented new and useful Improvements in Boll-Weevil Catchers, of which the following is a specification.

This invention relates to devices for catching boll weevils and it has for its object to produce a device of this class which may be conveniently applied to and used in connection with an ordinary cultivator of any suitable well known construction so that the infested leaves and punctured squares may be gathered at the time of plowing the cotton without additional labor or expense for this purpose.

A further object of the invention is to produce a boll weevil catcher of extremely simple and inexpensive construction in connection with means for connecting the same with the frame of a cultivator in such a manner that it may be conveniently raised or lowered for transportation and for operation in the most efficient manner.

A further object of the invention is to produce a simple and efficient boll weevil catcher comprising side members suspended from a supporting frame, means being provided whereby said side members may be variously spaced apart to permit passage therebetween of growing plants of various sizes.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Fig. 3 is a rear elevation.

Fig. 4 is a perspective view showing the boll weevil catcher detached from the cultivator, parts having been broken away.

Fig. 5 is a horizontal sectional detail view taken on the line 5—5 in Fig. 1.

Corresponding parts in the several figures are denoted by like characters of reference.

Figure 1:
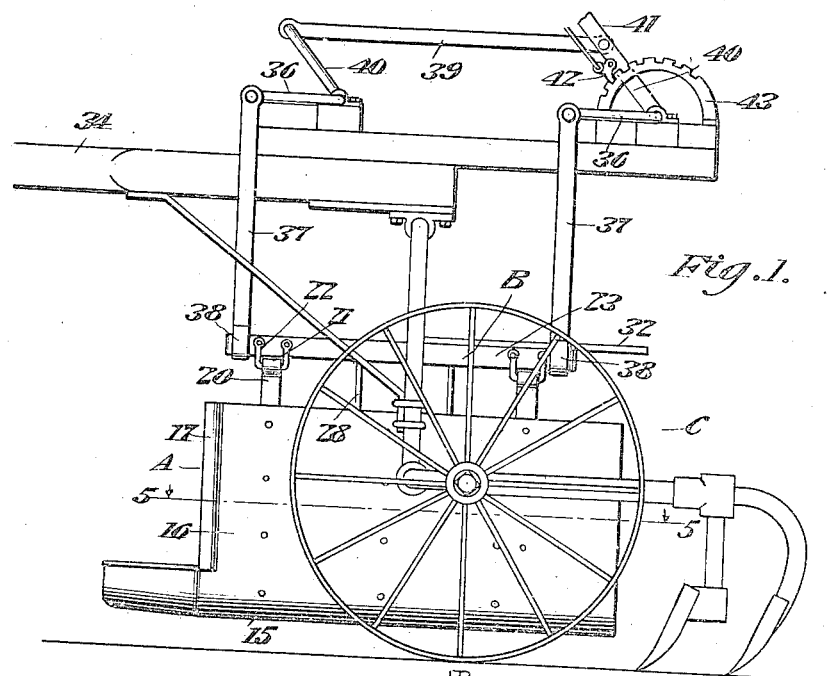
Figure 1 is a view in side elevation showing the improved boll weevil catcher applied to a cultivator in position for operation.
Figure 2:
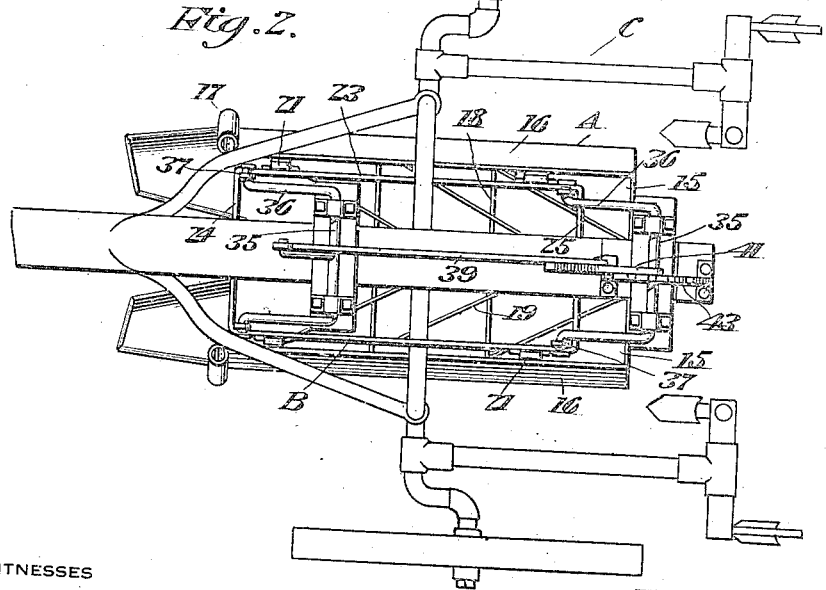
Fig. 2 is a top plan view of the same.

The improved boll weevil catcher includes two side members A, each formed of a sheet of galvanized metal or other non-corrodible material by shaping or bending the same so as to form a trough 15 having at the outer edge thereof an upwardly extending wall portion 16. These troughs may be of substantially semi-circular cross section as seen at the left side of Fig. 3, or they may be of substantially V-shaped cross section as seen at the right side of Fig. 3, no limitation being made as to the particular shape, but the V-shaped trough being considered preferable. The troughs 15 are beveled or pointed at their front ends and the material at the forward end of each wall portion is shaped to form a cylindrical tube 17 lying adjacent to the outer face of the wall portion and constituting a guard member to prevent injury to the plants that enter between the side members of the device. Each of the troughs is provided with a plurality of transverse partitions 18 forming compartments in which crude oil or some other insecticide may be placed, the partitions serving to prevent the liability of overflow when the device is in motion. Secured on the inner face of each wall portion is a plurality of beaters 19, the same being in the nature of springs, the front ends of which are riveted upon or otherwise attached to the wall portions, the springs attached to the respective wall portions being so arranged as to converge in a rearward direction so as to offer no obstructions to the passage of plants therebetween while, by the passage of plants, the springs will be vibrated so as to beat the plants, thereby detaching leaves and punctured squares and causing the same, as well as insects detached from the plants, to drop into the troughs on which they may be subsequently gathered and burned or otherwise destroyed.

Each of the wall members 16 is provided adjacent to the front and rear ends thereof with upwardly extending straps 20 having terminal eyes 21 whereby they are hingedly connected with keepers 22 adjacent to the front and rear ends of the side members 23 of a rectangular supporting frame B. The front and rear members 24, 25 of the frame B are provided with stirrups 26 supporting a longitudinal frame bar 27 having a downwardly extending yoke 28. A substantially vertical shaft 29 which is journaled in the bar 27 and yoke 28 is provided at its lower end with a cross bar 30 the ends of which are connected with the side walls 16 by means of links 31. Connected with the upper end of the shaft 29 is a rearwardly extending arm or lever 32 by means of which the shaft may be rotated, thereby actuating or swinging the side members A so as to cause the troughs at the lower ends thereof to be spaced variously apart for the passage of plants of different sizes. The rear cross bar 25 of the frame B may be provided with notches 33 in which the lever 32 may be accommodated for the purpose of securing said lever and the parts controlled thereby in various adjusted positions.

Supported on the tongue 34 or on some other suitable part of the frame structure of a cultivator which is generally designated at C and which may be of any well known and approved construction, are transverse shafts 35, said shafts being arranged in substantially parallel relation to each other and each of said shafts having cranks 36 at the ends thereof. Connected with the said cranks are suspension members 37 provided at their lower ends with loops 38 wherein the side members of the frame B are supported, preferably in such a manner as to enable the said frame B and the parts connected therewith to be readily detached when desired. The shafts 35 are connected together so as to operate in unison by means of a link or connecting rod 39, the ends of which are pivotally connected with arms 40 on the respective shafts. One of said shafts is also equipped with a hand lever 41 having a stop member 42 engaging a rack segment 43 whereby the hand lever and the parts controlled thereby will be securely retained in adjusted position. It will be readily seen that by manipulating the hand lever 41 the supporting frame of the parts connected therewith may be raised to a suitable position for transportation or lowered to a substantially ground engaging position which is the preferred position for engaging the plants when the machine is in operation.

From the foregoing description taken in connection with the drawings hereto annexed the operation and advantages of this invention will be readily understood by those skilled in the art to which it appertains. The improved device may be manufactured and marketed at a very moderate expense and it is capable of being very readily and conveniently applied or attached to almost any type of cultivator of ordinary and well known construction, thus enabling the boll weevils infesting the plants to be gathered and destroyed at the time of cultivating the crop and without additional expense for labor. The side members of the device may be variously spaced apart for proper manipulation of the lever 32 so as to operate successfully on plants at various stages of growth. The entire device may be vertically adjusted to suit any requirements by manipulation of the hand lever 41.

What is claimed is:—

1. In a device of the class described, a rectangular supporting frame having side members provided with keepers, wall members having strips provided with loops engaging the keepers to swingingly support the wall members, resilient beaters on the inner faces of the wall members, and troughs formed at the lower ends thereof.

2. A device of the class described, including side members each formed of a sheet of metal by bending or shaping the same to produce a trough having an upwardly extending wall member at the outer edge thereof, the material at the forward end of the wall member above the trough being bent to form a cylindrical tube constituting a guard member.

3. In a device of the class described, a rectangular supporting frame, side members swingingly connected therewith, each of said side members comprising a wall member having resilient beaters on the inner face thereof and a longitudinal trough at its lower edge, a frame bar connected with and extending longitudinally of the supporting frame, a yoke on said frame bar, a shaft journaled in said yoke and frame bar and having a cross bar at its lower end, links connecting the ends of said cross bar with the swingingly supported side members, and an operating lever connected with the upper end of the shaft.

4. In a device of the class described, a rectangular supporting frame, side members swingingly connected therewith, each of said side members comprising a wall member having resilient beaters on the inner face thereof and a longitudinal trough at its lower edge, a frame bar connected with and extending longitudinally of the supporting frame, a yoke on said frame bar, a shaft journaled in said yoke and frame bar and having a cross bar at its lower end, links connecting the ends of said cross bar with the swingingly supported side members, and an operating lever connected with the upper end of the shaft, the rear end member of the rectangular supporting frame being provided with notches wherein the latter may be accommodated.

5. In a device of the class described, a rectangular supporting frame, side members swingingly connected therewith, said side members including wall members having beaters and gathering troughs connected therewith, a pair of rock shafts having cranks, links connected with said cranks and provided at their lower ends with loops wherein the side members of the supporting frame are detachably mounted, and means for operating the rock shafts in unison and for securing them at various adjustments.

In testimony whereof I affix my signature.

THOMAS CLAUDE HINES.

Copies of this patent may be obtained for five cents each, by addressing the "Commissioner of Patents, Washington, D. C."